United States Patent [19]

Polaert

[11] Patent Number: 4,911,528

[45] Date of Patent: Mar. 27, 1990

[54] ANAMORPHOTIC OPTICAL SYSTEM AND COMBINED ANAMORPHOTIC/DEANAMORPHOTIC ARRANGEMENT

[75] Inventor: Rémy Polaert, Villecresnes, France

[73] Assignee: U.S. Philips Corp., New York, N.Y.

[21] Appl. No.: 296,459

[22] Filed: Jan. 12, 1989

[30] Foreign Application Priority Data

Jan. 19, 1988 [FR] France ................................ 88 00551

[51] Int. Cl.$^4$ ............................................. G02B 6/08
[52] U.S. Cl. ................................................. 350/96.27
[58] Field of Search ................ 350/96.27, 96.18, 96.25

[56] References Cited

U.S. PATENT DOCUMENTS 4,139,261 2/1979 Hilsum ............................ 350/96.27

FOREIGN PATENT DOCUMENTS 2537295 6/1984 France .

OTHER PUBLICATIONS

King et al., "Correcting Image Distortion with Fiber Optic Tapers", Applied Optics, vol. 27, No. 10, 15 May 1988, pp. 2048–2054.

Primary Examiner—John D. Lee
Assistant Examiner—Phan T. Heartney
Attorney, Agent, or Firm—William L. Botjer

[57] ABSTRACT

Anamorphotic optical system transmitting an image while deforming it in one direction and leaving it undeformed in a substantially perpendicular direction. It comprises a main fibre-optical image guide (210) cemented to an exit face (213, 213$_2$) of at least one beveled supplementary fibre-optical guide (220, 220$_2$), the axes of the optical fibres of the two guides (210, 213, 213$_2$) being not parallel to one another. Thus, the magnification of the image is not uniform in the direction of deformation. The transmitted image has either at least two parts each representing a different magnification, or a progressive deformation in the direction of the deformation.

7 Claims, 2 Drawing Sheets

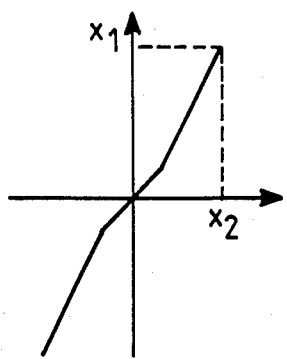
FIG. 1A
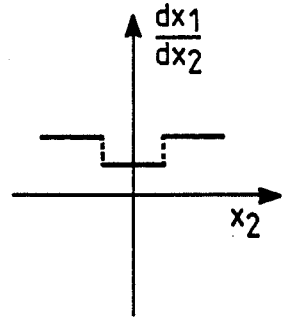
FIG. 1B
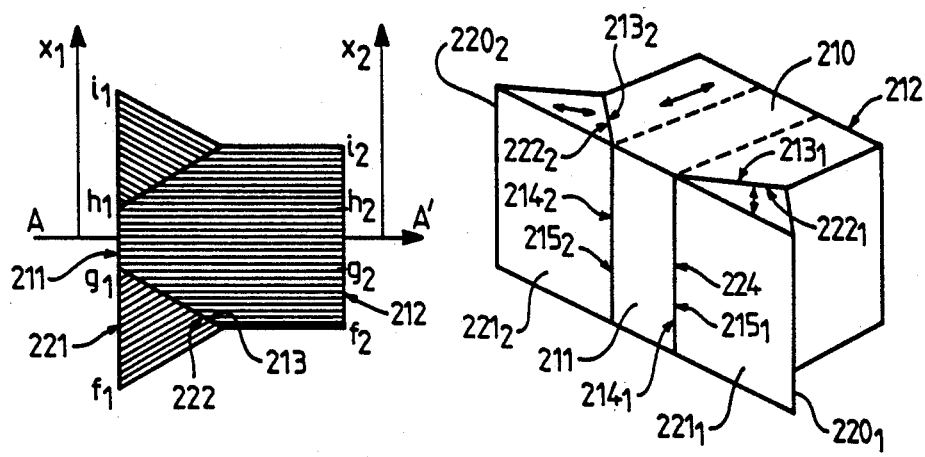
FIG. 1C
FIG. 1D

ANAMORPHOTIC OPTICAL SYSTEM AND COMBINED ANAMORPHOTIC/DEANAMORPHOTIC ARRANGEMENT

BACKGROUND OF THE INVENTION

The invention relates to an anamorphotic optical system transmitting an image while deforming it in one direction and leaving it undeformed in a substantially perpendicular direction. The invention also relates to an anamorphotic/deanamorphotic arrangement.

An optical system of this type is known from the document FR 2,537,295 in which an infrared anamorphotic arrangement is described. It comprises two prisms arranged in such a way that an image is deformed in only one direction X and is not subjected to a deformation in the other direction Y. Thus, an object having a square format is observed as a rectangular format, while one of the dimensions remains unchanged.

Referring to the co-ordinates in the two directions X and Y as $x_1$ and $x_2$ and $y_1$ and $y_2$, respectively, for the object ($x_1$, $y_1$) and the image ($x_2$, $y_2$), the following equations hold:

$$x_1 = kx_2 \text{ and } y_1 = y_2.$$

The coefficient k is a constant for this type of anamorphotic arrangement. It thus deforms the obtained image in a uniform manner.

For certain applications it is necessary to have an anamorphotic arrangement in which k is not a constant and which may have different values throughout the range of co-ordinates $x_1$ of the image.

The technical problem is to have an amorphotic optical system in which the coefficient k is not constant throughout the image in the direction of deformation.

SUMMARY OF THE INVENTION

This solution provided by the present invention is characterized in that the anamorphotic optical system comprises a main fibre-optical guide having a non-planar entrance face at least a part of which is connected to the entire beveled exit face of at least one supplementary fibre-optical guide, the remaining part of the entrance face of the main guide and the entrance face of the supplementary guide being coplanar and forming the entrance face of the anamorphotic optical system, the axes of the optical fibres of the two guides being not parallel to one another, the exit face of the anamorphotic optical system being that of the main image guide.

One of the objects envisaged by the invention is to have a different resolution in the centre and on the edges of the field of view. This may be achieved by having on either side of the central zone an observation field which is larger but which has a smaller resolution. Thus, when a scene is observed, the observer will pay attention to a central part of the scene he is interested in and he will not pay so much attention to the surrounding parts. The anamorphotic optical system gives the observer an increased amount of information of this central part at the expense of the lateral parts. The observer's field of view is thus decomposed into two parts, a central part and the remaining part of the field of view, which parts have different levels of resolution.

A first embodiment is characterized in that the transmitted image comprises at least two parts having different magnifications in the direction in which the deformation appears.

This embodiment may be further characterized in that it comprises:

a main fibre-optical guide whose optical fibres are parallel to one another and to the optical axis of the anamorphotic optical system, the guide having the shape of a polygonal prism with a lateral entrance face and a lateral exit face which are substantially perpendicular to the axis of the optical fibres, and at least one lateral face adjacent to the lateral entrance face and intersecting said face in accordance with a main lateral edge, the adjacent lateral face being inclined with respect to the axis of the optical fibres, and at least one supplementary fibre-optical guide having the shape of a triangular prism, which lateral entrance face intersects its lateral exit face in accordance with a supplementary lateral edge at a given angle, the axes of the optical fibres being oblique with respect to the system optical axis, said fibre axes being directed towards the optical axis of the anamorphotic optical system in the direction of propagation of the light beams, the lateral exit face of the supplementary guide being connected to the adjacent lateral face of the main guide, said main lateral edge and said supplementary lateral edge coinciding.

It is also possible to render the resolution progressively smaller when passing from the central part to the lateral parts of the field of view, or when passing from the right-hand side to the left-hand side of the field of view or conversely.

A second embodiment of the anamorphotic system is characdterized image has a progressive deformation in the direction in which said deformation appears.

This embodiment may be further characterized in that it comprises:

a main fibre-optical guide having the form of a cylinder whose directrix has a first curved segment and at least a second segment said guide having a curved lateral entrance face receiving the light beams, which is the face generated by the generatrix of the cylinder engaging the first curved segment of the directrix, and a lateral exit face which is the face generated by the generatrix of the cylinder engaging the second segment of the directrix, the axes of the optical fibres being parallel to one another and to the optical axis of the anamorphotic optical system, and at least one supplementary fibre-optical image guide having the form of a cylinder with an entrance face and a curved lateral exit face, the axes of the optical fibres being oblique with respect to the system optical axis, said axes being directed towards the optical axis of the anamorphotic optical system in the direction of propagation of the light beams, the curved lateral exit face of the supplementary guide being complementary and connected to the curved lateral entrance face of the main guide.

The anamorphotic system may form part of a more complex optical system whereby the exit face of the anamorphotic system coincides with the object face of an output objective.

The anamorphotic optical system can also be used in a reversed sense, thus constituting a deanamorphotic optical system.

The invention also relates to a combined anamorphotic/deanamorphotic arrangement which is characterized in that it comprises two anamorphotic optical systems, one system being used for forming a first deformed image and the other being used for reconstituting an undeformed image.

BRIEF DESCRIPTION OF THE DRAWINGS

The invention will be described in greater detail by way of example with reference to the accompanying drawings in which FIGS. 1A, 1B, 1C, 1D show curves and two diagrams of an anamorphotic optical system realising a uniform deformation in one direction in a part of the image.

DESCRIPTION OF THE PREFERRED EMBODIMENT

Preferably, the anamorphotic optical system decomposes the field of view into a high-resolution central part and into lateral parts having a smaller resolution. In this case the anamorphotic optical system supplies an image which is uniformly deformed in one direction in a certain part of the image. FIGS. 1C and 1D show an anamorphotic optical system supplying an image which is deformed in its extreme parts, whereas the central part is not modified.

An image formed at the entrance face will be transmitted through optical fibres to the exit face: the entrance points $f_1$, $g_1$, $h_1$, $i_1$ are conjuged with the points $f_2$, $g_2$, $h_2$ and $i_2$, respectively. The cental entrance part $g_1$ - $h_1$ is imaged without any deformation at $g_2$ - $h_2$, whereas the lateral dimensions of the images of the entrance elements between $h_1$ and $i_1$ and between $f_1$ and $g_1$ will be reduced by a certain factor. This anamorphosis does not affect the vertical dimension of the elements of the image. The image formed at the exit face appears intact in the central zone and compressed in the lateral zones but with only along the horizontal axis. In the example shown in FIGS. 1C and 1D the central part $g_1$ - $h_1$ covering 20% of the horizontal field is imaged at $g_2$ - $h_2$ convering 33% of the sensitive surface of the image detector.

FIG. 1A shows the variation of the abscissa $x_1$ at the entrance face as a function of the abscissa $x_2$ at the exit face. FIG. 1B shows the derivative $dx_1/dx_2$ with horizontal parts defined by the lines of transition between the blocks of optical fibres.

The two faces 211, 212 may be placed in the image and object planes, respectively, of an input objective and an output objective which objectives are not shown. The expression "image plane" may also be understood to mean a curved image surface. Preferably these two faces 211, 212 are substantially parallel. In this case the direction of the optical fibres of the main guide 210 extends substantially from the face 211 to the face 212. For the supplementary guides $220_1$, $220_2$ the direction of the optical fibres is inclined with respect to the entrance faces $221_1$, and $221_2$, respectively. This direction must intersect the exit faces $222_1$, $222_2$, respectively.

It is possible to use a single supplementary guide $220_1$ and to decompose the field of view into a left part and a right part having different resolutions. In a preferred embodiment of the invention the field of view is decomposed into a high-resolution central part and into lateral parts having a smaller resolution. In this case two supplementary image guides $220_1$, $220_2$ are used and the angles at which the optical fibres of these guides extend to the optical axis AA' of the system are equal and have opposite signs.

Figure 2A:
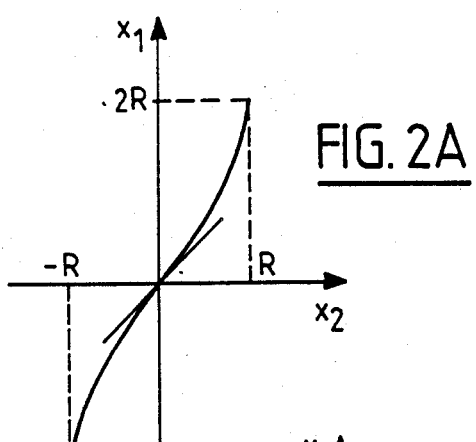
FIGS. 2A, 2B, 2C, 2D, 2E show curves and three diagrams of an anamorphotic optical system realising a progressive deformation in one direction in a part of the image.
Figure 2B:
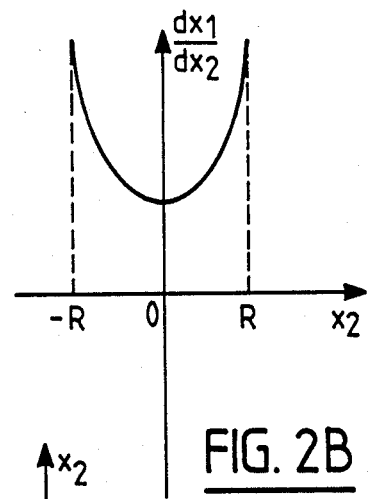
Figure 2E:
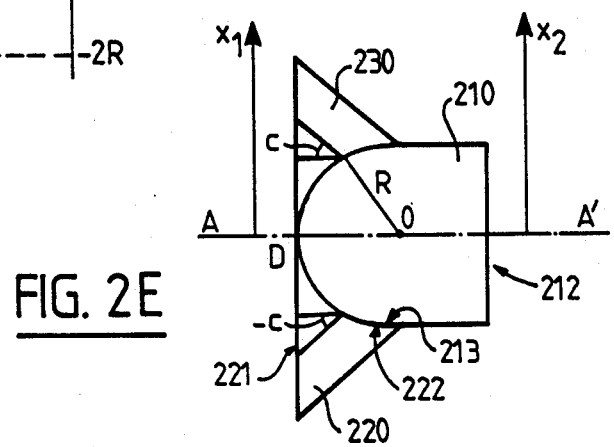
Figure 2C:
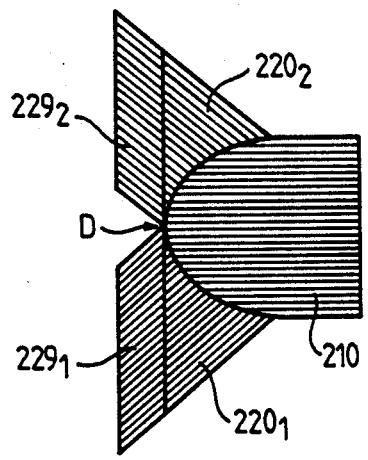
Figure 2D:
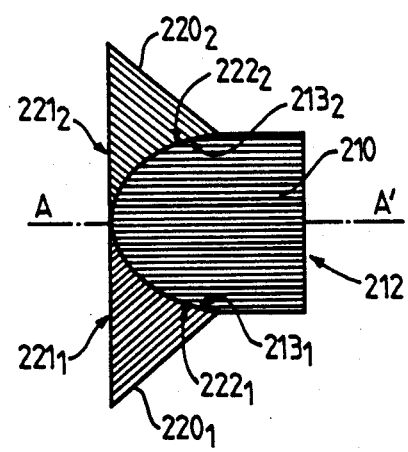

Another embodiment of the anamorphotic optical system, shown in FIG. 2D, supplies an image which is progressively deformed in one direction in a certain part of the image.

The reference marks used in FIGS. 1C and 1D are also used in FIGS. 2C and 2D for analogous parts. In FIG. 2D the entrance face 211 of the main guide shown in FIG. 1D has disappeared and the entrance face $221_1$ of the supplementary guide extends as far as the optical axis AA' of the system. The contact faces $213_1$ and $222_1$ between the main guide and of the supplementary guide are no longer plane but in this embodiment they are the lateral faces of a cylinder having a quarter of a circle as a curved directrix.

In this embodiment a continuous and progressive variation of the pitch of the image elements along the horizontal axis is obtained (or the vertical axis when the optical system is rotated). The two lateral guides $220_1$ and $220_2$ constitute blocks (FIG. 2C) whose optical fibres extend at angles $+c$ and $-c$ with respect to the optical axis $AA_1$ of the system (FIG. 2E). These guides are ground and polished so as to follow the rounded profile of the main guide 210 perfectly. In the embodiment of FIG. 2E the guide 210 is cut in the form of a convex semi-cylinder having a radius R. The guides $220_1$ and $220_2$ are cut in the form of a concave cylinder having the same radius R, cemented to the guide 210 and then ground and polished until the entrance plane is tangent with the main guide at the point D, eliminating the parts $229_1$ and $229_2$ (FIG. 2C).

Using the afore-mentioned notations, the rule for progressive and continuous anamorphosis is:

$$x_1 = x_2 + R \, tg \, c \, [1 - (1 - x_2^2/R^2)^{1/2}].$$

FIG. 2A shows the variations of the abscissa $x_1$ at the entrance face as a function of the abscissa $x_2$ at the exit face. Fig. 2B shows the derivative $dx_1/dx_2$ with a continuous variation having a minimum at the point D.

It is of course also possible to use faces $213_1$ and $222_1$ or $213_2$ and $222_2$ having different forms, for example with reversed concave sides, so that a different anamorphosis is obtained.

I claim:

1. An anamorphotic optical system transmitting an image while deforming it in one direction and leaving it undeformed in a substantially perpendicular direction, characterized in that it comprises a main fibre-optical guide having a non-planar entrance face at least part of which is connected to the entire beveled exit face of at least one supplementary fibre-optical guide, the remaining part of the entrance face of the main guide and the entrance face of the supplementary guide being co-planar and forming the entrance face of the anamorphotic optical system, and axes of the optical fibres of the two guides being not parallel to one another, the exit face of the anamorphotic optical system being that of the main image guide, the entrance face of the anamorphotic optical system being different in dimension from that of the exit face of the anamorphotic optical system in one direction and the same in a direction perpendicular to said one direction.

2. An anamorphotic optical system as claimed in claim 1, characterized in that in the direction in which the deformation appears the transmitted image comprises at least two parts having different magnifications.

3. An anamorphotic optical system as claimed in claim 2, characterized in that it comprises:
- a main fibre-optical guide whose optical fibres are parallel to one another and to the optical axis of the anamorphotic optical system, the guide having the shape of a polygonal prism with a lateral entrance face and a lateral exit face which are substantially perpendicular to the axis of the optical fibres, and at least one lateral face adjacent to the lateral entrance face and intersecting said face in accordance with a main lateral edge, the adjacent lateral face being inclined with respect to the axis of the optical fibres,
- and at least one supplementary fibre-optical guide having the shape of a triangular prism, which lateral entrance face intersects its lateral exit face in accordance with a supplementary lateral edge at a given angle, the axes of the optical fibres being oblique with respect to the system optical axis, said fibre axes being directed towards the optical axis of the anamorphotic optical system in the direction of propagation of the light beams, the lateral exit face of the supplementary guide being connected to the adjacent lateral face of the main guide, said main lateral edge and said supplementary lateral edge coinciding.

4. An optical system as claimed in claim 1, characterized in that the transmitted image has a progressive deformation in the direction in which said deformation appears.

5. An optical system as claimed in claim 4, characterized in that the anamorphotic optical system comprises:
- a main fibre-optical guide having the form of a cylinder whose directrix has a first curved segment and at least a second segment said guide having a curved lateral entrance face receiving the light beams, which is the face generated by the generatrix of the cylinder engaging the first curved segment of the directrix, and a lateral exit face which is the face generated by the generatrix of the cylinder engaging the second segment of the directrix, the axes of the optical fibres being parallel to one another and to the optical axis of the anamorphotic optical system,
- and at least one supplementary fibre-optical image guide having the form of a cylinder with an entrance face and a curved lateral exit face, the axes of the optical fibres being oblique with respect to the system optical axis, said axes being directed towards the optical axis of the anamorphotic optical system in the direction of propagation of the light beams, the curved lateral exit face of the supplementary guide being complementary and connected to the curved lateral entrance face of the main guide.

6. An anamorphotic optical system as claimed in claim 1, used in an optical arrangement characterized in that the exit face of the anamorphotic optical system coincides with the object face of an output objective.

7. A combined anamorphotic/deanamorphotic arrangement, characterized in that it comprises two anamorphotic optical systems as claimed in claim 6, one system being used for forming a first deformed image and the other being used for reconstituting an undeformed image.

* * * * *